UNITED STATES PATENT OFFICE.

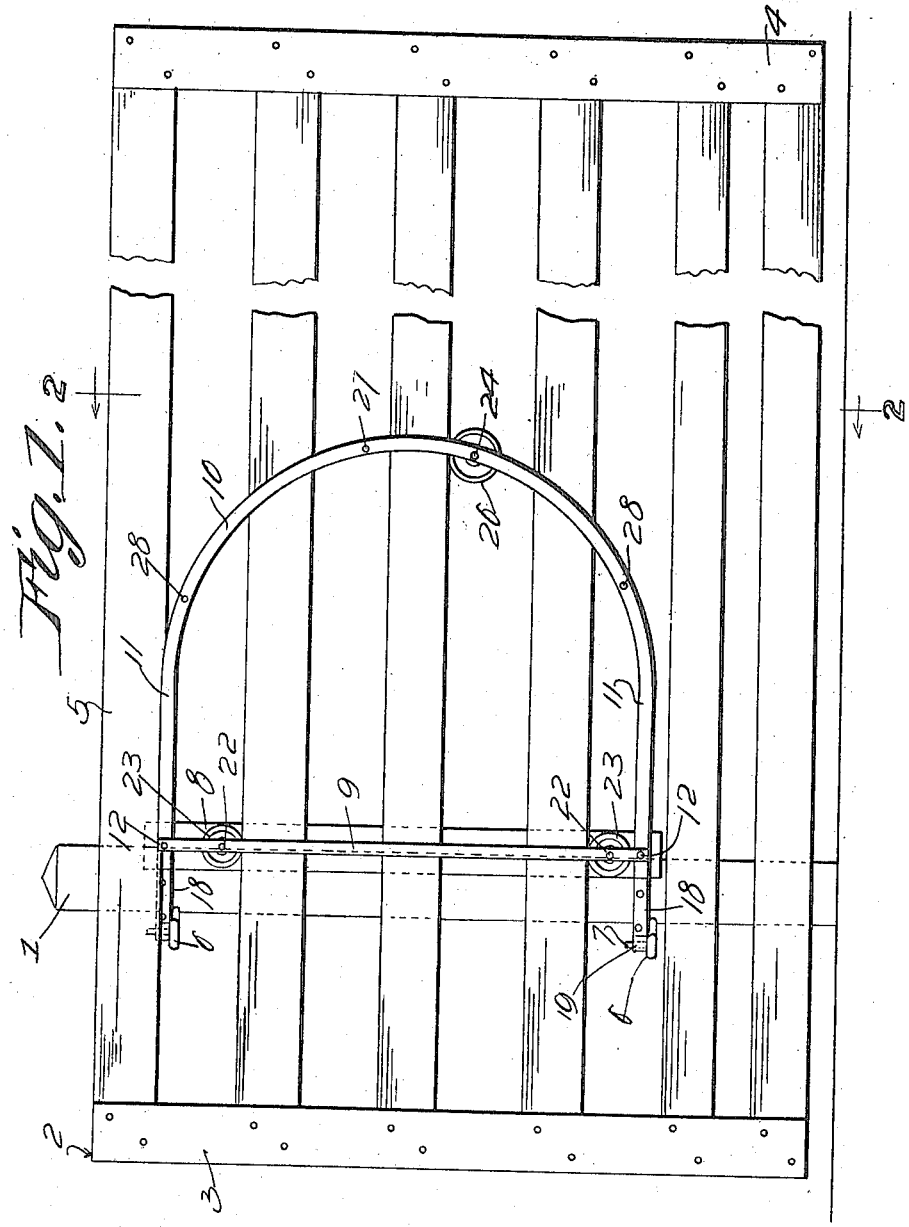

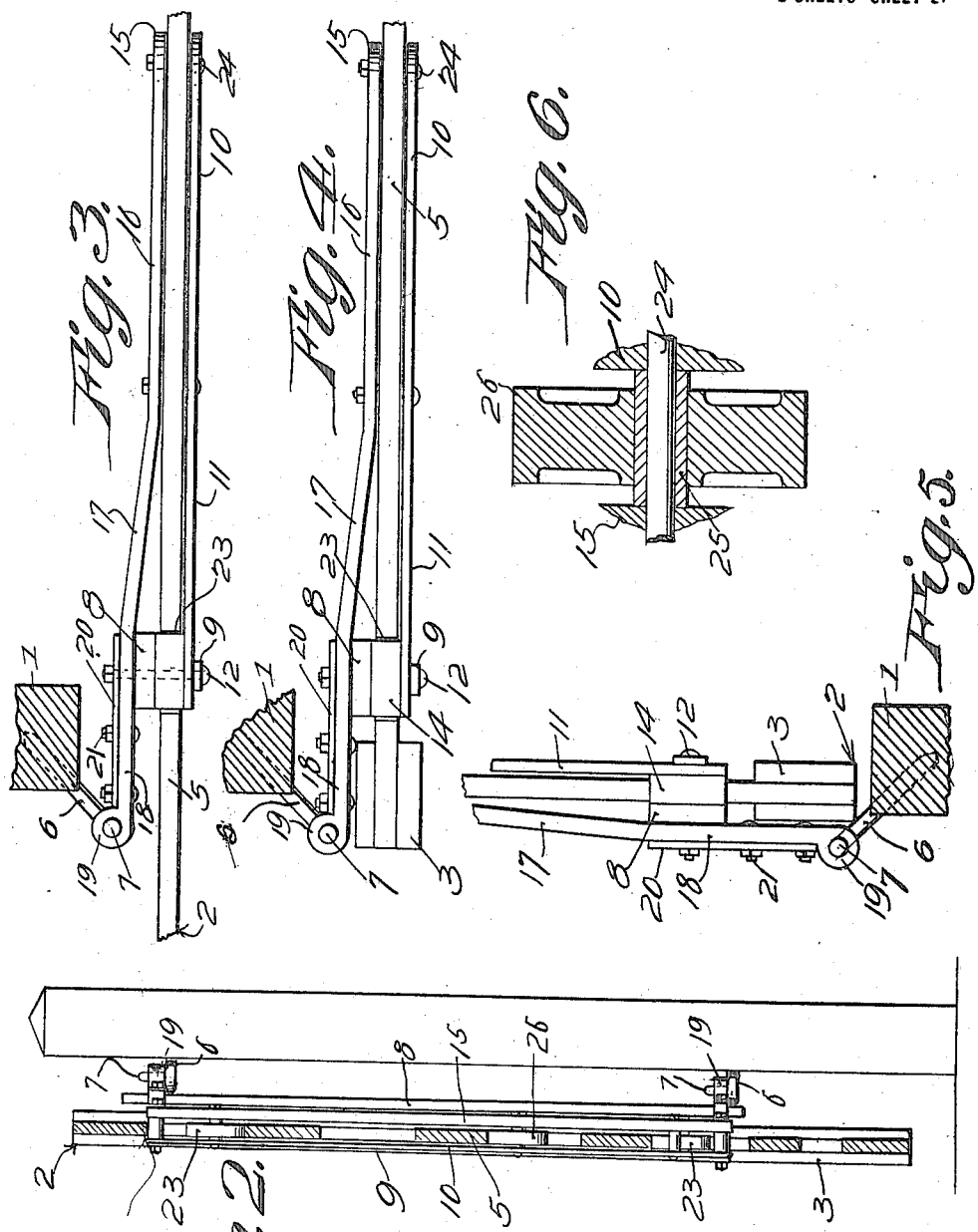

CHARLES D. SMITH, OF PARIS, ILLINOIS, ASSIGNOR OF ONE-HALF TO CHARLES P. BROWN, OF PARIS, ILLINOIS.

GATE-HANGER.

1,221,237.  Specification of Letters Patent.  Patented Apr. 3, 1917.

Application filed May 24, 1916. Serial No. 99,625.

*To all whom it may concern:*

Be it known that I, CHARLES D. SMITH, a citizen of the United States, residing at Paris, in the county of Edgar and State of Illinois, have invented a new and useful Gate-Hanger, of which the following is a specification.

The device forming the subject matter of this application is a gate, and the invention aims to provide novel means for supporting the gate for swinging movement and for sliding movement, selectively, at the will of an operator.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in side elevation, a gate constructed in accordance with the present invention, parts being broken away;

Fig. 2 is a cross section on the line 2—2 of Fig. 1;

Fig. 3 is a fragmental top plan of the gate, the support or post being shown in section, the gate being in the position which it will assume when it is manipulated as a sliding gate;

Fig. 4 is a view similar to Fig. 3, but showing the gate positioned for use as a swinging gate;

Fig. 5 is a fragmental top plan of the gate, showing the same swung from the position of Fig. 4, the support or post appearing in section;

Fig. 6 is a fragmental sectional detail illustrating one of the gate directing rollers and its mounting.

The numeral 1 indicates a support which may be a post, and the numeral 2 denotes generally, a gate which may be of any desired form. In the present instance, the gate 2 is shown as comprising end bars 3 and 4 connected by slats 5. Rearwardly projecting gudgeons 6 are mounted diagonally in one corner of the post 1 and includes upstanding pintles 7. The gudgeons 6 project toward the rear or inner end of the gate.

The gate 2 is mounted to slide in a frame that swings on the gudgeons 6. This frame includes an upright bar 8 located on one side of the gate 2, and an upright strip 9 located on the other side of the gate. An arched bracket 10 lies on one side of the gate 2 and constitutes a part of the frame above alluded to, the bracket 10 including horizontal arms 11 which extend across the strip 9 to the rear thereof. Securing elements 12 unite the upper and lower ends of the strip 9 with the arms 11 of the bracket 10 and with the bar 8. On the securing elements 12 are mounted fillers 14 interposed between the arms 11 and the bar 8. Disposed on the opposite side of the gate from the bracket 10 and constituting a part of the gate supporting frame is an arched bracket 15 including arms 16, offset as shown at 17 to coöperate with the bar 8, and terminating in extensions 18 which project toward the post 1 beyond the bar 8, as will be clearly understood from Figs. 3 and 4. The securing elements 12 hereinbefore alluded to engage the extensions 18 and engage also, reinforcing plates 20 applied to the extensions 18 and held thereon by additional securing members 21. The extensions 18 terminate in eyes 19 receiving the pintles 7 of the gudgeons 6, and thus the gate supporting frame may be swung on the gudgeons. Adjacent their upper and lower ends, the strip 9 and the bar 8 are connected by shafts 22 carrying rollers 23 coacting respectively with upper and lower edges of certain of the slats 5 of the gate 2. Mounted in the curved portions of the brackets 10 and 15 is a shaft 24 carrying a rotatable sleeve 25 on which is journaled a roller 26. Such elements as the sleeve 25 may be used in connection with the rollers 23 hereinbefore mentioned. The roller 26 engages the lower edge of one of the slats 5 of the gate. Above the slat against which the roller 26 bears, the brackets 10 and 15 are provided with alined holes 27. The shaft 24 may be mounted in the holes 27 when desired. The gate 2 in the drawings is shown as mounted to swing on the left hand post. When it is desired to mount the gate to swing on the right hand post, the gate is turned end for end, and is turned up side down. Then the shaft 24 is mounted in the holes 27 as hereinbefore mentioned. The brackets 10 and 15 may be connected by pins 28 carrying spacing sleeves like the sleeves 25 in Fig. 6.

When the gate is in the positions of Figs. 1 and 3, the gate may be moved endwise and be made to operate as a sliding gate, the rollers 26 and 23 serving to direct the movement of the gate. The gate also may be used as a swinging gate if desired.

Owing to the position of the gudgeons 6 on the post 1, and because of the offsetting of the arms 16 as shown at 17, the gate may be slid or swung without difficulty.

The gudgeons 6 project from the support 1 at an angle of approximately forty-five degrees to the plane occupied by the gate when the gate is closed. Consequently, when the gate is fully opened, as shown in Fig. 5, the gate is housed behind the support 1.

Having thus described the invention, what is claimed is:—

1. In a device of the class described, a support; a frame hinged to the support; a roller; means for mounting the roller on the frame; and a gate mounted to swing with the frame on the support and including a bar mounted to slide on the roller; the frame being symmetrical with respect to a horizontal axis to provide for an inversion and for an end for end reversal of the frame, thereby to suspend the gate for left hand swinging movement or for right hand swinging movement, and said means being duplicated to permit the roller to be disposed beneath the bar when the frame is inverted and turned end for end.

2. In a device of the class described, a frame comprising U-shaped parts including upper and lower arms, the arms of one part being longer than the arms of the other part; means for connecting the parts of the frame; a connection uniting the arms of one part; a gate slidable between the parts of the frame and comprising bars; a roller journaled on the outer end of the frame and engaged beneath one bar; a roller journaled on the connection and engaged beneath another bar; a roller journaled on the connection and engaged above a third bar; and a support to which the longer arms are terminally pivoted.

In testimony that I claim the foregoing as my own, I have hereto affixed my signature in the presence of two witnesses.

CHARLES D. SMITH.

Witnesses:
E. A. TROVER,
GEO. A. VAN DYKE.